Oct. 17, 1967 P. A. SCHERER 3,347,197
FOIL SYSTEMS
Filed Sept. 10, 1964 8 Sheets-Sheet 2

INVENTOR
PAUL A. SCHERER
BY John Gibson Semmes
ATTORNEY

Oct. 17, 1967 P. A. SCHERER 3,347,197
FOIL SYSTEMS
Filed Sept. 10, 1964 8 Sheets-Sheet 3

INVENTOR
PAUL A. SCHERER

BY *John Gibson Semmes*

ATTORNEY

INVENTOR
PAUL A. SCHERER

BY *John Gibson Semmes*

ATTORNEY

Oct. 17, 1967 P. A. SCHERER 3,347,197
FOIL SYSTEMS
Filed Sept. 10, 1964 8 Sheets-Sheet 6

INVENTOR
PAUL A. SCHERER
BY Semmes & Semmes
ATTORNEYS

INVENTOR
PAUL A. SCHERER

3,347,197
FOIL SYSTEMS
Paul A. Scherer, Bowie, Md., assignor, by mesne assignments, to Paul A. Scherer, Glenn Dale, Md., as agent
Filed Sept. 10, 1964, Ser. No. 396,806
58 Claims. (Cl. 114—66.5)

This invention relates to the constant thrust propulsion of fluids and to the lifting and propulsion of air and marine craft and hydrofoil ships which are specifically designed for operation in ocean waters. This is a continuation-in-part of my application Ser. No. 36,882, filed June 17, 1960, now abandoned and entitled Hydrofoil Ship Construction.

It is related to that of Michael H. Vavra Patent No. 2,749,870 entitled Hydrofoil Attack Craft dated June 12, 1956; Paul A. Scherer et al. 2,749,871 entitled Flap Depth Control for Hydrofoil Craft dated June 12, 1956; Patent 3,141,437 entitled Constant Lift System for Craft issued July 21, 1964 in the names of Vannevar Bush, Paul A. Scherer and Rudolph X. Meyer.

Marine craft

In ocean waters, problems of in-flight control arise as a result of weather and sea influences. According to the concept of this invention, the ship under consideration is capable of extended operating range and high cruising speeds. It is thus a principal objective of this invention to create ships having cruising speed at high speed exceeding that of conventional displacement craft. By design, this ship when operating without precision controls is "locked" to the main sea pattern, thus obtaining stability.

Whereas the invention may be described with respect to specific military use, it will be appreciated that adaptation for cargo transport may be undertaken without departing from the spirit hereof. Ships having payloads of the order of fifteen (15) to ten thousand (10,000) or more tons are within the scope of this invention.

Basically, the invention as applied to marine craft embraces means for supporting a hull-platform in flight above the level of the sea, with stability of platform irrespective of the weather and sea conditions for which the ship has been specifically designed. Such stability at speed permits the landing and take-off of helicopters as well as the landing and launching of light aircraft and the launching of missiles. It is also an objective of this invention to provide ship design whereby the ship may have high maneuverability and in which the hull-platform thereof may be maintained stable irrespective of ship maneuver, weather and sea conditions. Maneuver herein may be effected from full stop to full speed and from full speed to stop and reverse. Echelon and sidewise maneuver is within the ship's maneuver characteristics. The invention resides in the combination of ship supporting elements, mounting and controls therefor, and unique propulsion system enhances the basic concept of invention.

Under light loading, the hull-platform does not serve as a displacement element. The ship under light loading will be fully supported at rest, as well as in operation by the displacement foils. As described herein, displacement foils refer to hydrofoils having sufficient buoyancy to support the unloaded craft above water when at rest and having means to submerge the foils when underway. When submerged, displacement foils also have the characteristics of dynamic foils. The ship which is shown in the drawings is supported by a plurality of symmetrical section hydrofoils mounted on struts, the lift of the respective foils on each side of each strut being substantially equal at any given time. The described configuration without precision controls will vary the lifting force with depth. In the basic concept, it is proposed that each of the three basic struts shall carry two or more independently actuable foils in parallel, the foil or foils on each side of each strut having "constant lift" or balanced moment means in dynamic connection therewith to yield an integrated overall lift. Control through "constant lift" enables each of the separate foils to be operated independently of others, thus ensuring maximum stability to the craft irrespective of its velocity, the seaways through which the ship may be passing, or wind and weather elements above the surface of the water such as might affect the hull and depending struts thereof.

The term "constant lift" has been defined to mean force-balanced, as where the lift of the foil is made stable, over a broad range of speed in the fluid, the tail need not be elevated to effect control as in airplane attitude of craft or the disturbed condition of the fluid through which the foil may pass. The lift of a foil, in such systems, is made stable by providing a working force which operates about a spanwise fulcrum of a foil in opposition to the "lift" of the foil passing through the fluid. According to the constant lift invention as defined in Patent No. 3,141,437 entitled Constant Lift System for Craft, issued July 21, 1964, in the names of Vannevar Bush et al., "constant lift" is accomplished by providing a controllable force or generated force, generating as a moment acting in opposition to the lift of the foil and which moment in normal flight, balances the lift. Constant lift, herein, is applicable at a programmed depth.

By ship design, an effort is made to obtain maximum lift over drag (L/D) ratio, the results thereof yielding economy in fuel consumption.

In this connection, the supporting foils of the craft are adapted to "wet" and "dry" boundary layer control. Boundary layer control on large foils of the present type is known to yield decreased drag.

To comprehend the present concept, the following fundamentals must be considered. As deeply submerged lifting foils approach the surface of the water their centers of dynamic lift are known to shift aft from the deep water position of approximately 25% of chord. This shift is noticeable at one to one and one-half chord submergence, being about 4% of chord, and increasing rapidly as the loaded foil nears the surface. For instance, the center of dynamic lift is found at approximately 45% of chord when the foil is submerged to a depth equal to 50% of chord. True, the lift of a foil at a given angle of attack and constant speed falls off as the foil comes to the surface, but this is not marked until the foil is very near the surface.

If a foil is running at depth and in balance with its loading, so that its depth is remaining constant (no perturbations of sufficient magnitude to materially alter the dynamic balance) and then an increment is added to the applied force the foil will rise, lifting its load. As the surface is approached, the center or lift will shift aft and the foil will reach a level such that the applied moment and the reacting moment are again balanced. Thus, the foil seeks a unique level of submergence. When the rearward shift of the center of lift is large as compared with the distance between the pivot line and the center of lift at depth, the controlling force resulting from the shift will be large with a "hard locking" to the surface pattern. Thus hard locking occurs when the main foils are running under an applied moment substantially greater than necessary to support the load at depth.

It is known that at high speeds a foil must have a low angle of attack to avoid cavitation. At the same time it should have an angle of attack of sufficient value to give a high lift over drag ratio. This means that a balancing of the load to the foil for a given "hardness" of locking to the surface is delicate. There follows a means of effecting this balance, other than by exact ship loading, including the use of ballast.

Consider two foils (pivoted forward of their lift lines) which are attached in superposed relation, the lower being strut connected to the bottom of the upper foil and each is supplied with a mechanism which may apply a given moment to each foil tending to vary its angle of attack. Assume that their chords are of substantial difference in dimension, let the lower one be of smaller chord than the upper. This arrangement can be varied (it is simply used for illustration). The lower foil under this proposal is chosen so that its chord is a fraction of its submergence; and, hence, substantially insensitive to the surface effect. While the lower foil might have a high aspect ratio, its total surface would be small relative to the upper or main foil. If the unit loading of the main foil is unduly heavy it would have to run at considerable depth in order to have a "soft" locking action. If, however, the lower foil carries positive lift, the system will ride at shallower depth for the same "hardness."

Clearly, the further aft the smaller foil is carried on the main foil, the more effective the smaller foil becomes. The smaller foil is mounted aft of the center of lift of the main foil.

In a ship used for anti-submarine warfare (ASW) work, as is contemplated, positive buoyance is of value since the ship could thus remain on foils while stopped. Upon getting underway, the lower foils then are used to submerge the main foils.

Accordingly, the main and upper foil proposed is of such size as to carry a major portion of an excess of the designed load by its buoyant lift. As indicated, if such a foil is too lightly loaded for a sufficient "locking" action, the use of the small foil at negative but constant lift will increase the "hardness" for a given submergence. If the main foil has excess buoyancy so that at rest a portion of its volume floats above the surface, then the lower foil operating at constant negative lift may submerge the system. If its moment for negative lift is gradually increased, the system will gradually submerge and seek its particular level suitable to the configuration.

It is within the concept of invention that one or more displacement foils, fixed or pivoted to strut may be employed to carry out purposes hereof. The ship construction, for instance may comprise craft having forward and after struts of displacement characteristics, the forward strut only mounting a displacement foil transversely. Such foil may be fixed or pivoted, the fixed foil having means for effecting differential flow control about its respective surfaces to alter circulation thereover. Such control is described hereinafter. This comprises utilization of the displacement foil in its simplest and basic form.

Displacement foils, per se, are designed for normal submerged operation within one chord length of the surface of fluid medium. If, on the other hand, a displacement foil is operated at a given submergence, even in an undisturbed body of water, and if the command moment (or torque) is increased to cause the nose of the displacement foil to rise, its dynamic lift will be increased to a new value causing the craft to rise. Nevertheless, the rearward shifting of the lift line on the foil as it rises toward the surface will increase the dynamically induced moment, rotating the nose downward, with the foil seeking a new balance of moments. This results in decreased lift, negative acceleration, and balanced operation at the new level of submergence. The constant lift system, employed in connection with the dynamic foil, seeks stabilized operation at a demand submergence. On the other hand, the inherent increase of the chord—submergence ratio of the displacement foil over the dynamic foil renders the adoption of the displacement foil unique and constitutes a major contribution of invention herein.

Referring to the drawings wherein like members indicate like elements:

FIGURE 13A is a cross sectional view of the jets shown in FIGURE 13;

*The hydrofoil ship*

Figure 1:
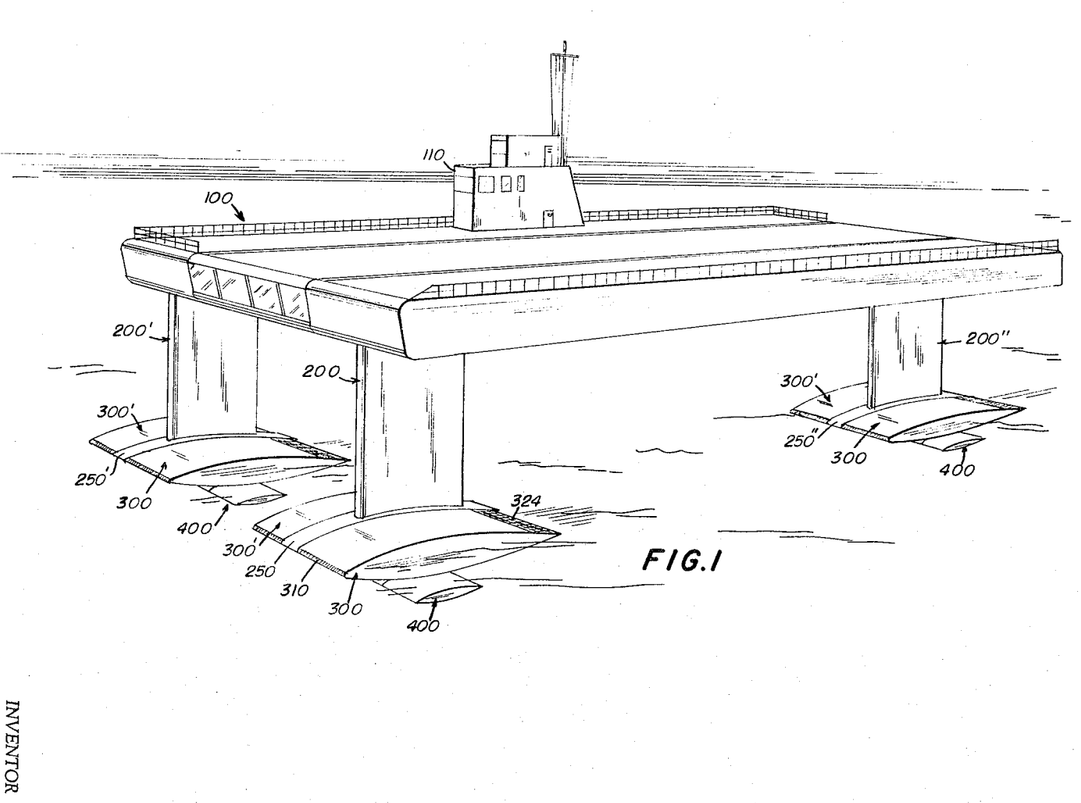
FIGURE 1 is a view in perspective of ship according to the invention.

Referring to FIG. 1, the ship itself includes a hull complex 100 having a suitable launching and take-off area for craft and control bridge 110 as shown, said hull having sufficient depth to accommodate the storage of aircraft and to provide facilities for the maintenance thereof. In practice, the hull will house power and foil control stations for inter-connection to all dynamic foils including the lower foils. Additionally, the hull will include suitable means for controlling roll, such as gyroscopic element and an inertial guidance control station will be among the control stations.

Figure 5:
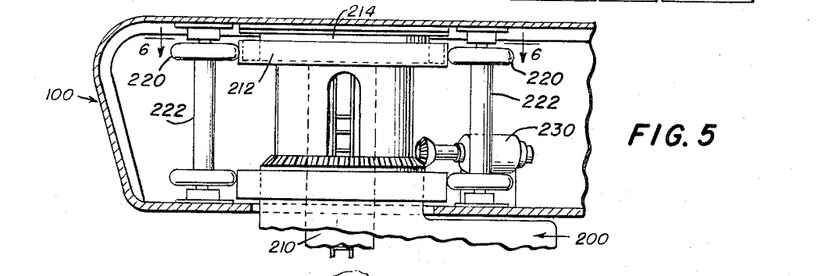
FIGURE 5 is an exposed view of load bearing shaft in hull-platform with gear, pinion, and motor means for applying dynamic force turning moment to strut.

Strut assemblies 200, 200' and 200" engage the hull 100 in bearing the relation, said struts being adapted to free or controlled power rotary movement, upon command. Free movement of the forward struts about an axis of rotation preferably forward of their dynamic center of lift will tend to control yawing of the craft, for instance. Controlled power rotation of the strut is applied by motor 230 as shown in FIG. 5. Alternatively, since the struts are of a foil cross-section, they may be turned by a constant lift system similar to that disclosed in co-pending application 737,355, now Patent No. 3,141,437 for controlling the foils. Desired constant lift on the struts, except when maneuvering, is zero. Each of the respective struts is permitted 360° of rotation or more, conventional steerage for the ship being effected by rotation of after strut 200", and its connected hydrofoils 300, 300'. In profile, the strut assemblies are of preferably 10% section, being designed of 30 foot chord, 3 foot maximum thickness and 60 foot height top to bottom. Each secures to a tubular load bearing shaft 210, the top of which is contiguous to a "pressure pad" 212.

Figure 6:
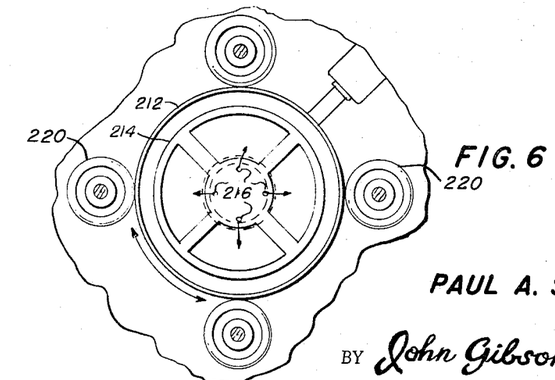
FIGURE 6 is a view in horizontal section taken along the lines 6—6 of FIGURE 5 showing strut "pressure pad"

Comprising a thrust bearing having fluid under pressure as shown in FIGS. 5 and 6, is a cushion 214 controlled conventionally by upwards and approximately balancing pressure of the head of the strut shaft 210. If the pressure is excessive, a fluid leaks from holes 216, coating pressure pad 214 and the contacted hull structure. The design yields substantially zero starting friction as well as low operating friction. If both head of strut and corresponding bearing surface of the cushion 214 are made of a "Teflon" type substance, this in combination with the oil component of the pressure pad yields desired result.

Horizontal movement of the struts along the hull is prevented by strut positioning rollers 220, which are mounted upon shaft 222. Shaft 222 is rotatably mounted in hull 100.

Each strut is interconnected at its base to the aligned and rigid fuselage type foil support 250, the support being of foil profile. This rigid strut-support connection forms an "L" construction, the apex of which is preferably forward of centers of lift of the respective displacement foils connected thereto. All struts and strut support shafts provide access to the respective displacement foils. The foil "compression column" is immediately adaft the strut shaft as will be indicated hereinafter.

Connecting the foils to the strut fixed support 250 in bearing relation is a transverse tubular pivot 252 (FIG. 3) wherein the seals 254 between movable foils and fixed pivot contain packing glands adapted to seal the brine out by carrying a constant head of oil pressure somewhat greater than the brine pressure, irrespective of movement of the craft. Again, a "pressure pad" type sealing is desired.

Turning now to the principal foils 300, they are preferably symmetrical in design to fly "locked in" as to depth; but when idle, to rest at the surface of the water as flotation elements, a portion only thereof protruding above. The foils are thus described as displacement foils, dynamically loaded. Each specific foil is of 15% section. Chord, span and thickness dimension are noted therein.

The following is a specific definition of the preferred class of foil.

NACA 662-015
[Stations and ordinates given in percent of airfoil chord]

| Upper Surface | | Lower Surface | |
|---|---|---|---|
| Station | Ordinate | Station | Ordinate |
| 0 | 0 | 0 | 0 |
| .5 | 1.122 | .5 | −1.122 |
| .75 | 1.343 | .75 | −1.343 |
| 1.25 | 1.675 | 1.25 | −1.675 |
| 2.5 | 2.235 | 2.5 | −2.235 |
| 5.0 | 3.100 | 5.0 | −3.100 |
| 7.5 | 3.781 | 7.5 | −3.781 |
| 10 | 4.358 | 10 | −4.358 |
| 15 | 5.286 | 15 | −5.286 |
| 20 | 5.995 | 20 | −5.995 |
| 25 | 6.543 | 25 | −6.543 |
| 30 | 6.956 | 30 | −6.956 |
| 35 | 7.250 | 35 | −7.250 |
| 40 | 7.430 | 40 | −7.430 |
| 45 | 7.495 | 45 | −7.495 |
| 50 | 7.450 | 50 | −7.450 |
| 55 | 7.283 | 55 | −7.283 |
| 60 | 6.959 | 60 | −6.959 |
| 65 | 6.372 | 65 | −6.372 |
| 70 | 5.576 | 70 | −5.576 |
| 75 | 4.632 | 75 | −4.632 |
| 80 | 3.598 | 80 | −3.598 |
| 85 | 2.530 | 85 | −2.530 |
| 90 | 1.489 | 90 | −1.489 |
| 95 | .566 | 95 | −.566 |
| 100 | 0 | 100 | 0 |
| L.E. radius: 1.435 | | | |

National Advisory
Committee for Aeronautics

See: International Advisory Committee for Aeronautics Wartime Report, Summary of Airfoil Data, originally issued March 1945 as Advanced Confidential Report L5C05 by Ira H. Abbott, Albert E. VonDoenhoff and Lewis S. Stibers, Jr. of Langley Memorial Aeronautic Co. Laboratory, Langley Field, Va., specifically incorporated by reference herein. The particular foils of this ship are designed for top speed, at zero angle of attack, of 55 knots, producing a cruising speed for the craft of approximately 45 knots.

Constant lift, signalled by inertial guidance control and the action of lower foils applies rotary moments to the respective foils, rotating them about rigid shaft 252 in opposition to the lift characteristic of the foil, balancing same in flight. In practice, the compression is vertically applied through actuation system 500 on the compression link 510, causing the pivoted arm 530 to depress the respective parallel foils or raise them, as the case may be in balanced relation as will be apparent. The arm extension wheels 532 will ride in corresponding tracks 560 of each foil. Compression member 510 is ball-mounted at each end.

As shown, the foils are pivoted about the spanwise tubular member 252 forward of foil center of lift, the pivot line being established at approximately 25–30% of chord. As such hydrofoils in movement approach sea surface, the center of lift, it is known, shifts toward the foil trailing edge, said shift being approximately 5% of chord at a submergence of 1 chord.

Although the invention is defined with reference to symmetrical foils per se, it is not limited to the use of such foils. Cambered foils with and without boundary layer control are of practical value and contemplated in the ship.

As indicated, it is within the invention to produce a ship 100 approximately 200 ft. in length whose main (displacement) foils 300 have a chord of 56 ft. The foils thus may be disposed in three units, each unit having span dimension of 33⅓ feet. Thus two foils and support each comprise a 33⅓ foot unit and where two units are disposed side by side, they are spaced by an amount to permit greater than 360° rotation in a horizontal plane. 15% section rectangular plan foils are used so as to permit high sub-cavitation speed for the ship. The displacement of such foils would be slightly in excess of 1,800,000 pounds. Assuming the gross weight of the ship and loading were 1,600,000 pounds there would be a positive buoyancy of 200,000 pounds, or 12½%. If the ship were cruising at 30 knots the lower (supplemental) foils 400 having chord of 5.6 feet, total span of 100 ft. and rectangular plan form, one would have a total of 560 square feet of projected area. At a lift coefficient of −0.1 each lower foils 400 would exert a downward force of approximately 140,000 pounds. However, in order to achieve a "locking in" action for the main foil system 300, the lower foil should exert a force of more than 200,000 pounds. A constant moment on the bottom foil of such a value as to yield an average angle of attack of minus 2 degrees, produces a negative lift of 280,000 pounds and this would suffice for certain sea conditions. The main foil moment may be originally balanced for its buoyancy. As the ship 100 submerges its foils 300, the applied moment on the main foils 300 may be increased by the hydraulic system 500 until a balance is obtained at a suitable depth and the ship is "locked in" to the wave pattern. By suitably altering the respective applied foil moments, inherent depth control can be rendered as "hard" as desired. It is to be noted that the main foil with its chord of 56 feet would not be sensitive to waves of short length but would be responsive to waves of great length. In this connection and as a practical matter, one would not often encounter wave systems in the North Atlantic of 25 feet or more.

Assume this ship to proceed at 30 knots, the pivot line for each foil being 13 feet abaft the leading edge. It is desired now to operate the ship at a mean effective depth of foils of 28 feet or ½ chord. For a given foil section the dynamic lift line of the foil, as stated above, would be about 45% of chord, 25.2 feet, from the leading edge. At this submergence the change in submergence in order to shift the dynamic lift line 1% of chord forward or aft of the 45% of chord position would be about .85 of a foot, or a change of 0.85 feet in submergence would shift the center of dynamic lift by 0.56 feet. If the sections were NACA 662-015 the center of buoyancy would be at about 40% of chord or 22.4 feet from the leading edge. Where the pivot line is 13 feet abaft the leading edge of foil 300, the strut to which each lower foil 400 is pivoted is in turn each secured to the main foil whereby the center of lift of the lower foil shall fall directly below the center of buoyancy of the main foil. The compression columns 500 in line of the cylinders shown, exert a downward force at the center of buoyancy, preferably, although for simplicity the FIG. 2 drawings show the column to be slightly behind the center of buoyancy of main foil. One is now able to set up moments about the pivot line. The moments tending to increase the angle of attack of the main foils are designated as positive, while those tending to decrease that angle will be negative. Treating all foils as one unit, one may apply a negative lift to the lower foil 400 sufficient to balance it at about 2 degrees of negative angle of attack. Since its chord is of small dimension relative to its submergence it will then produce a nearly constant downward force of the 280,000 pounds above mentioned. This force is applied about 9.4 feet from the pivot line producing a positive moment of 2,632,000 pound feet. Although the lower foil is force balanced by connection to constant lift mechanism, as is its corresponding main foil, the former does not have its parallel foils independently operable about the same strut.

Returning to main foils 300, they must support the gross weight of the ship, taken as 1,600,000 pounds plus the dynamic load of the lower foil for a total of $$1,600,000+280,000=1,880,000$$

They have about 1,800,000 pounds of buoyant lift and must carry the remaining 80,000 pounds by dynamic lift or a negative moment 80,000(12.2)=976,000 pound feet. The buoyant moment is negative and of a value 1,800,000(9.4)=16,920,000 pound feet. The remaining position moment required to balance the system is that produced by the compression column 500 and is of the value of 15,264,000 pound feet or a total column loading at a moment arm of 9.4 feet of about 1,625,000 pounds, somewhat less than that required to balance the buoyancy moment alone. If the depth is changed by 0.85 feet, for example increased, with the result that the center of dynamic lift shifts forward, see above, by 0.56 feet, the new moment arm becomes 12.2−.56=11.64 feet. If the other moments are held constant then the main foil will rotate upward to maintain its dynamic lift moment of 976,000 pound feet or to produce a lift of $$\frac{976,000}{11.64}=83,840 \text{ pounds}$$

a change of 3840 pounds. Since the curve is nearly linear, a change in depth of five feet would produce a correcting lift of about 19,200 pounds, resulting in an upward acceleration of about 1.2% g. This, while a "soft" control, would be adequate for fair weather operation. It is well to bear in mind that in a preferred form there will be three struts each of chord of 30 feet and 10% thickness and that the total change in displacement caused by a change of five feet in submergence would be about 6,000 pounds. This, combined with the 19,200 pounds would raise the acceleration to nearly 1.6% g.

If, by addition of ballast, perhaps partial flooding of the main foils, the gross weight of the ship is increased, then as stated earlier, the "hardness" of the controls may be increased to any reasonable degree. The ability to stop the ship with positive buoyancy on the main foils could be achieved in the suggested operation by simply "blowing the foil ballast." Stability in flight may also be accomplished in this manner, ballast control being effected by pendulum-type valve actuation.

Additional buoyancy foils aft and forward may be provided for in-port loading; these being retractable upon "flying" the craft.

As indicated, this invention also concerns the propulsion of fluids and the propulsion of vehicles through them. In particular, it applies to propulsion systems which under a given control setting will maintain substantially uniform circulation in the propulsion system and, hence, substantially uniform or constant thrust until the control setting may be altered, whereupon it will make smooth adjustment to maintain the new setting and thrust.

Certain terms hereinafter used, may be defined as follows:

"Circulation" for simple two-dimension flow is defined as $$\tau=\frac{L}{\rho V}$$

in which $L$=lift, $\rho$=mass density, $V$=velocity. This is in accordance with current accepted practice in the theory of fluid flow. For constant "circulation" at a given velocity and density we have "constant lift". If the circulation is constant the lift of a foil element is constant, whether this is achieved by boundary layer control, rotation of a foil to balance constant torque, adjustable flaps whether balanced by constant lift concepts or by selsyn controls in response to signals generated by the circulation flow over the foil system, and regardless of whether the flap is a conventional or a fluid flap or by differential control by pumping or otherwise. This is in accord with "lift line" theory.

To be explicit, "constant lift" devices are directed towards establishing and maintaining constant circulation. (Reference U.S. Patent 3,141,437 of July 21, 1964—Constant Lift System for Craft.)

"Torque" defines pivotal moments upon working foil.

"Thrust" defines the lift of working foil.

"Blade" defines a foil or vane with or without flaps.

That patent defines a specific balancing of moments whereby circulation is maintained at a value substantially inversely proportional to velocity over a considerable range of velocities through the fluid. There are other means of maintaining constant circulation such as flaps, conventional or jet, differential pumping over the surfaces of a blade, the use of ducting through a blade, the use of jets and suction slots, and variation in blade camber. Of course, a foil which is pivoted forward of its center of lift having an applied torque of given value meets the requirements of maintaining constant circulation.

The principles of this invention are thus applicable to all blades and foils which work through a fluid and impart work upon that fluid. The work is imparted by the lifting force upon the blade or foil. The product of this lifting force and the distance through which it works relative to the fluid, defines the work done on the fluid by the foil. The work done on the foil will be this amount plus the friction and "eddy losses" and one uses the latter term to include all losses associated with the "wake." A foil or blade in moving through a fluid at some angle of attack will create a lifting force on the foil, known as lift. The sum of all wake losses is designated as drag. As is known, the lift over drag ratio of the foil is a measure of its efficiency. A given foil at any given speed will have some angle of attack at which its maximum lift over drag ratio will be associated with a particular value of the "circulation" of the fluid about the foil or blade. As indicated, whenever the circulation is held constant the lift of a given section will remain constant.

*The propulsion systems*

Figure 8:
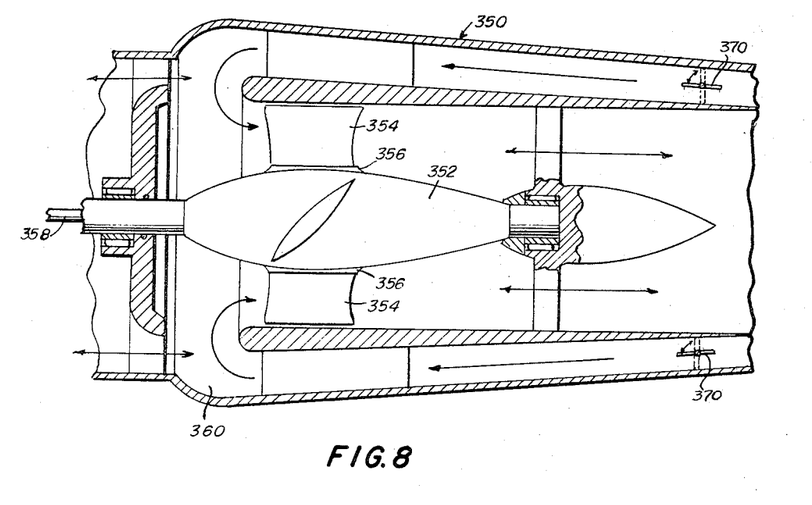
FIGURE 8 is an enlarged vertical sectional view of one pumping system shown adaptable to the foil of FIGURE 7, depicting reversible, axial-flow propulsion element.

In the propulsion pump systems of the principal foils 300 hub diameters are preferably one-third of length, the hub being a foil of 30% section. The axial-flow pump of FIGURE 8 may vary in number for each foil although one for each, suitably constructed may suffice.

In operation, it is possible to alter the angle of attack of the respective foils 354 comprising the pump so that the propulsion of the unit may be controlled, including reversal. Since the foils 300 are mounted for rotation, about the shaft 252, the system adapts itself convertibly to horizontal and vertical flight, as will be apparent. In construction, mounts 356 are offset from hub axis at about 45°. It is proposed that the water flowing through the system shall have a velocity below the cavitation level of the propeller, incipient cavitation of foils of this type being at speeds in excess of 55 knots. Thus, at normal design speeds one acquires propulsion without cavitation.

Figure 7:
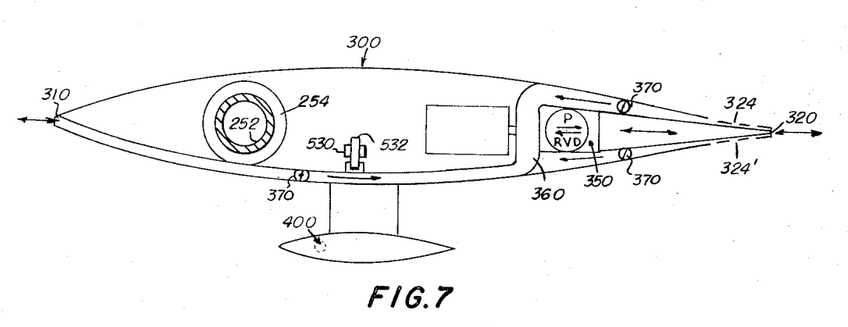
FIGURE 7 is a schematic diagram of principal foil interior.

Suitable valving 370 to vary intake at 324 is shown in FIGURE 7. Valving is designed for forward intake through port 310, or alternately to the rear through boundary layer control port 330 or after port 324. By control, all or one port may be used in flight. For reverse propulsion on each foil, one discharges through the forward port 310, induction being from either or both 330 and 324 ports. The propulsion system in each of the respective foils should be located as far aft in the foil as possible in order to counter a portion of the buoyancy moment of the foil. In the 66 Series NACA foil, above-described, there is increased cross-section aft with respect to many other symmetrical foils, thus permitting location of the propulsion system 350 well aft in the displacement foil.

The pump has a rotor 352 and adjustable blades 354. See FIGURE 8. Blade 354 may be pivoted around axis perpendicular to that of the rotor 352. In order to obtain the maximum efficiency a constant lift system controls the attitude of attack of the pump blades. Upon increase in apparent velocity of the respective pump blades through the fluid medium, the lift of the blades increases and the moment of such lift over-balances the demand moment of individual torsion bars not shown but attached to a constant lift system serving the respective blade foils through control rod 358. Reference to a similar constant lift system for rotating blades, especially the rotor blades of a helicopter is made at pp. 33, 34 and 35 of the related Constant Lift application, above. The usefulness of the constant lift system to the rotor blades is specifically described at page 34 in the sentence beginning on line 21. A constant lift system identical to that used to control the helicopter blades may be used to control the angle of attack of the pump blades. The blades of the pump may be of cambered profile.

Intakes for propulsion systems are disposed at the leading edge 310, at the trailing edge 320 and intermediately 324 and 324', FIGURE 7. Boundary layer control intakes 324 are disposed well in the high pressure after section of each displacement foil, to reduce the friction. In design, it is also contemplated that the respective foils be "severed" spanwise at trailing edge 320 to provide propulsive thrust outlet 330. Intake 324 is in an area of high pressure turbulent waters during flight (at zero, positive or negative foil angle of attack). See FIGURES 3 and 3A.

The displacement foils are adapted to the reduction of drag by means of intake apertures appropriately disposed on the surfaces of the foils. The induction and propulsion streams controllable by valves. The exhaust port 330 appearing at the rear of the foil houses a plurality of vanes 328 adapted to direct the flow of induced fluid evenly rearward from the trailing edge of the foil in the high pressure zone.

If we provide for constant lift of the blades of a propeller or the elements in a propulsion pump system we will produce a nearly constant propulsion force and the craft if at rest, will accelerate. When the power plant is operating at substantially constant speed, preferably controlled by a governor, the speed of the craft will increase until the input power is balanced by the power consumed in the propulsion system. In a propeller with the blades pivoted forward of the center of lift, and the propeller turning at some proportionate rate relative to the engine speed, each of which is constant, if the demand torque was initially zero in value, the blades would pass through the water without imparting thrust. When it is desired to move ahead or astern, a suitable demand torque would be established, the blades would initially take a small angle of attack which would increase as the craft increased its speed. For example, a ship having a propulsion system based upon control of the lift of the blades of a propeller or the working elements of a propulsion pump is moving ahead at substantial speed. It becomes necessary to stop (and possibly back) and to do so as rapidly as possible. If the engines are moving at constant governed speed, the maneuver is accomplished by simply reversing the direction of the demand torque upon the blades.

If a suitable value of torque is established the maximum reverse thrust of the propeller may be utilized. The angle of the blades relative to the shaft will decrease but will initially be of a value associated with forward propulsion at lower speed. As the ship slows down, and without further change in the demand torque, the angle relative to the shaft will continuously decrease and move into a reverse value. The thrust of the propeller has been reversed, and the ship will stop and reverse with effective use of the power plant, since the engines are turning at full power, and a major portion of the power is applied as useful thrust to the fluid. In a conventional propeller the shaft would be stopped and reversed. Normally, this would be associated with stopping and reversing the engines or gear train, all of this taking place at low efficiency and utilizing only a portion of the available power of the engines. This improved capability of maneuver and the corollary of efficient propulsion over a large speed range is of great value in the operation of ships. These effects can be realized, in part, with other variable pitch propellers, but the pitch would need to be altered with relationship to the instantaneous speed of the ship and at a rate which would balance the power of the power plant, a difficult affair. Further, in a conventional ship a blade of a propeller (in the course of each revolution) encounters a substantial variation in the velocity. This is the result of the disturbance caused by the passage of the ship. With constant lift established on the blades by means of a constant demand torque, the blades will adjust to the variations encountered in revolution.

There is provided a variation in cross-sectional area of the conduit which entrains the fluid top and through the pump and the propulsive jet. See, for example, the increased cross-sectional area adjacent the propeller in FIGURE 9. This variation is such that it insures approach velocity of the fluid to the blade or blades of the pump, whereby the cavitation number of the blade will not be exceeded at design operating speeds even though the cavitation speed of main supporting foil or foils of the ship is being approached. The cross-sectional area is decreased in the propulsive jet to induce a rearward velocity of the discharge fluid substantially greater than the speed of the craft through the fluid. The variation is obvious from FIGURE 9, and it will be apparent that an annular foil surrounding the external blades in the FIGURE 15 modification will serve a like purpose.

Figure 9:
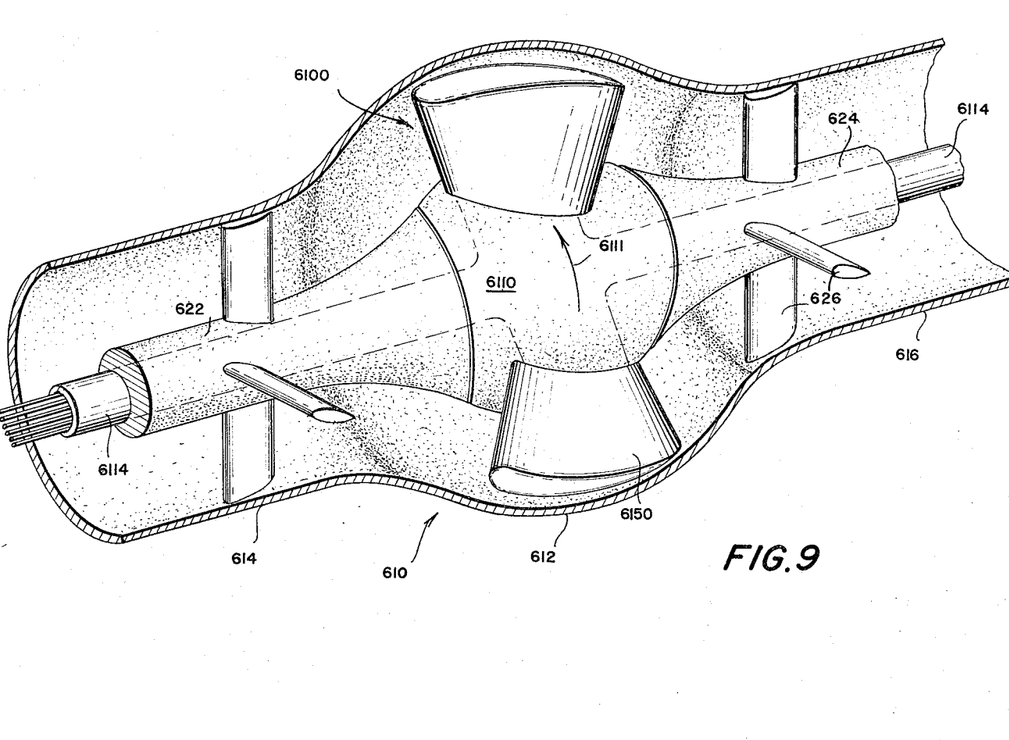
FIGURE 9 is a perspective view of an improved axial flow pumping system in modification of the FIGURE 8 system.

Internal propulsion system (FIGURE 9)

Referring to FIGURE 9, a conduit or pump housing is generally referred to by the number 610. Spherical casing 612, which encompasses the working elements of the pump includes inlet pipe 614 and outlet pipe 616. Rotating portions of the pump, i.e., spherical hub 6110 and blades 6150, are generally indicated by the numeral 6100.

Rotation occurs in the direction as indicated by arrow 6111, in forward propulsion. Hub 6110 is integrally formed with shaft 6114, which is enclosed by stators 622 and 624. Stator 624 is shown to be centered in exhaust pipe 616 by low-drag, foil-shaped struts 626. At the extreme left hand side of the drawing, hydraulic pressure lines are seen protruding from hollow shaft 6114. Fluid pumped by rotating blades 6150 is given a rotational component thus to convert this exhaust to axial flow, struts 26 are inclined slightly, defining positive angle of attack of about 3°. Direction of inclination is the same as that shown.

Figure 10:
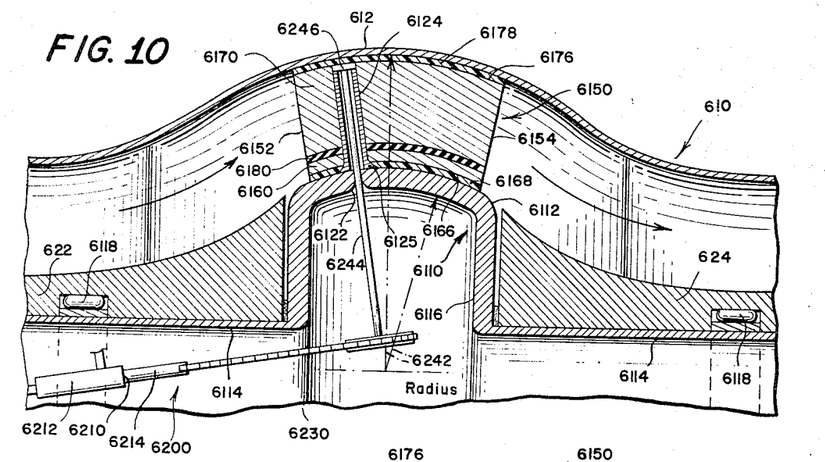
FIGURE 10 is a cross section of the upper half of the FIGURE 9 pumping system, taken through one blade, aligned in an axial direction.

Referring to FIGURE 10, hub 6110 and its spherical external surface 6112 are connected to shaft 6114 by its opposite radial walls 6116, shaft 6114 being positioned in stators 622 and 624 by roller bearings 6118.

Sleeve 6124 is welded to the spherical surface 6112 of hub 6110 in continuation of a radius thereof. Blades 6150 freely rotate upon sleeve 6124. In practice, each of these blades is constructed of an outer portion or tip section 6170 and an inner portion or root section 6160, separated by an expansion joint 6180. The center of rotation of the blade about sleeve 6124 is located closer to leading edge 6152 than to trailing edge 6154; consequently, the center of lift falls aft of the center of rotation. Now, the innermost limit of root section 6160 defines a concave spherical surface 6166, which is completely coated with bearing material such as Teflon. The outermost area of the tip portion 6170 of blade 6150 comprises a convex spherical surface 6176. Bearing material 6178 coats the outer blade surface 6176.

Figure 11:
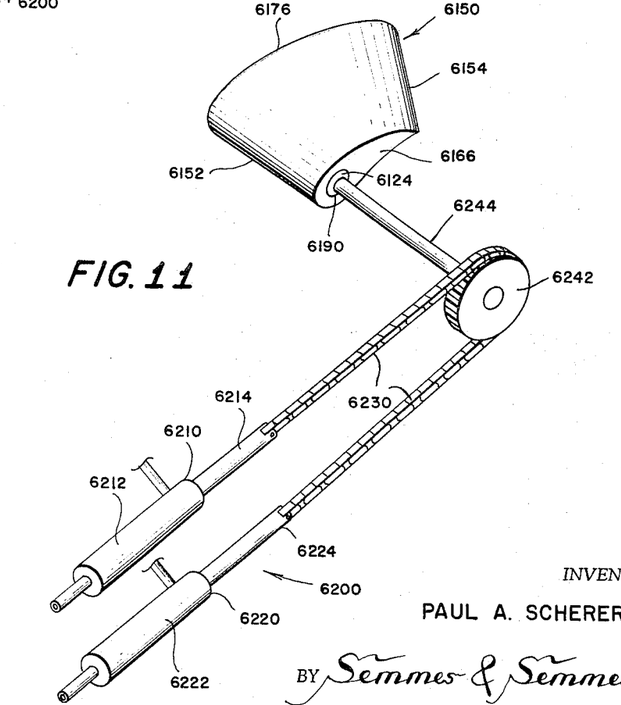
FIGURE 11 is a perspective view of a FIGURE 9 pump blade per se, constant pressure cylinders and interconnecting constant lift linkage.

Upset flange 6246 fixedly interconnects blade 6150 and control rod 6244, which freely extends through sleeve 6124. The system which applies torque to rod 6244 and subsequently to blade 6150 is generally indicated by the number 6200. Fluid actuator 6210 comprises pressure cylinder 6212 and an internal piston which is attached to piston rod 6214. The exposed end of the piston is connected to chain 6230. Chain 6230 engages sprocket 6242, said sprocket being fixed on the inner end of control rod or torsion bar 6244. An upper flange on control rod 6244 is rigidly fixed to blade 6150.

Pressures in cylinders 6212 and 6222 act through the pistons attached to rods 6214 and 6222 and chain 6230 to apply a turning movement to sprocket 6242. It will be appreciated that each blade 6150 is provided with its own "constant lift" apparatus 6200.

Torque may be applied to shaft 624 by means for producing a constant force disclosed in Patent 3,141,437, issued to Vannevar Bush, Paul A. Scherer and Rudolf X. Meyer, on July 21, 1964 and mentioned in my parent patent application Ser. No. 36,882 filed June 16, 1960, now abandoned. Alternatively, constant pressures may be applied to cylinders 6212 and 6222 from separately regulated sources.

Figures 12, 13:
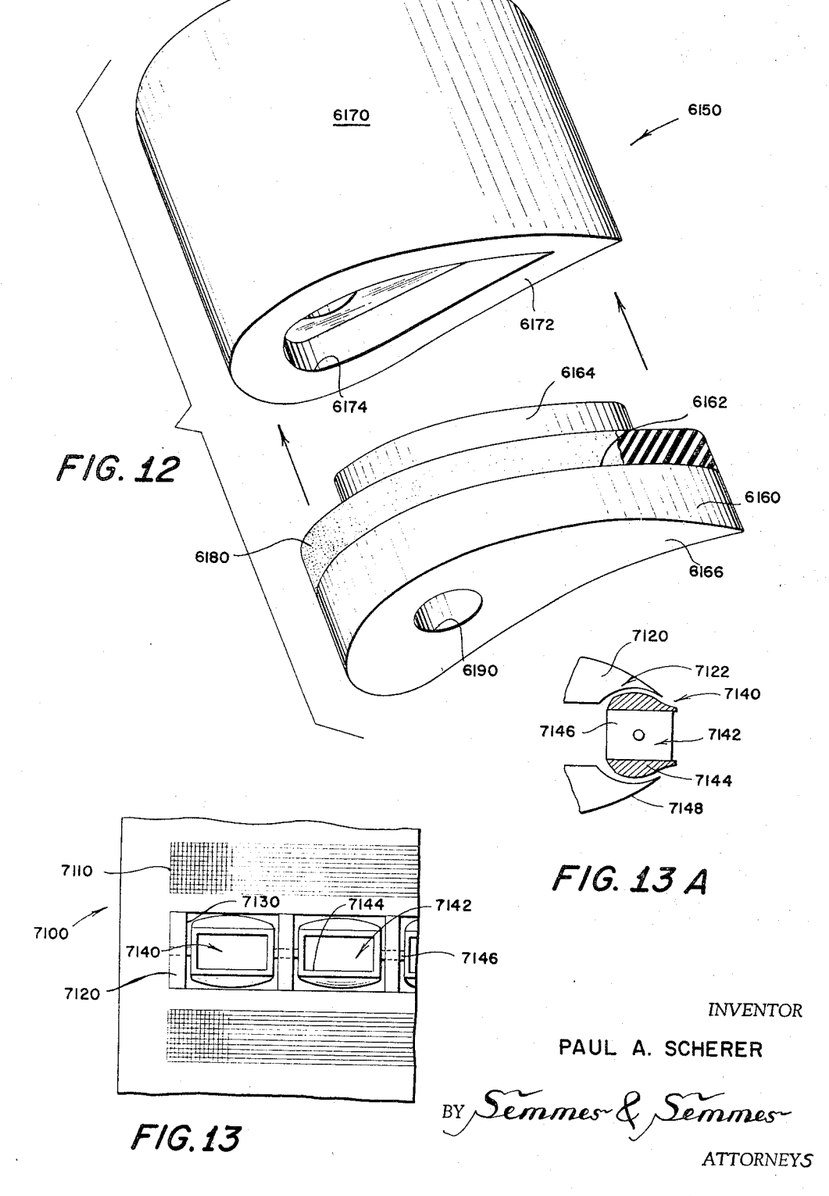
FIGURE 12 is an exploded view of the FIGURE 9 blade per se, showing the relation of elements of the blade expansion joint.
FIGURE 13 is a rear view of displacement foil, showing modified propulsion exhaust control jets.

FIGURE 12 is an exploded perspective view of the elements of blade 6150. Root portion 6160 and tip section 6170 describe complementary interfaces 6162 and 6172, which are separated by resilient cushion 6180. Axially elongated lug 6164 projects from root section 6160 into complementary recess 6174 in the tip section, locking these against relative movement. Aperture 6190, which receives sleeve 6124, continues as shown through lug 6164 into the outer portion of blade 6150.

When the entire system of FIGURES 9–12 is at rest, blades 6150 may be aligned normal to that shown in FIGURE 10. As shaft 6114 begins to rotate hub 6110 in the direction shown by the arrow 6111 in FIG. 9, constant differential pressures may be applied to cylinders 6212 and 6222, respectively. Resultant torque from the pressure differential moves the blades shown in FIGURE 9 in a counter-clockwise direction. Since the blades are pivoted forward of their centers of lift, rotation of the hub 6110 results in fluid impinging upon the blades causing torque with clockwise direction as shown in FIGURE 9. The blades seek a stable condition. If the rotational speed of the hub is varied, the blades will each change angle of attack until an equilibrium in torque is reached. Thus, the lift imparted to the fluid by the blade is independent of pump speed. Moreover, if the density of the fluid or the system pressures vary, the angles of attack of the blades will again adjust until the torque applied to the blade by the fluid equals the torque applied by the demand system.

The illustrated embodiment of this invention is ideally suited for the propulsion of ships. Its inherent qualities of preventing overload conditions likewise make the pump especially useful in continuous pumping operations. Maintaining circulation in large storage tanks can thus be accomplished with economy.

This pumping system is designed to suppress cavitation. The conduit cross-section may be expanded at the blades.

*Contained fluid control*

Figure 14:
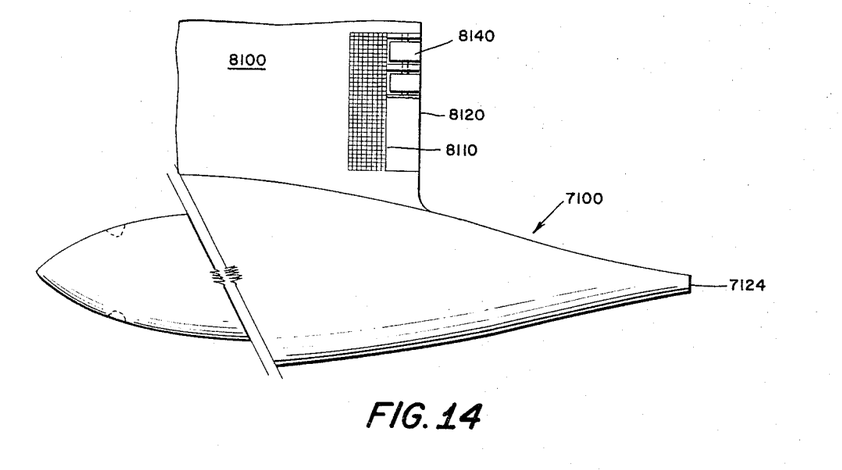
FIGURE 14 depicts the inclusion in displacement strut of guidance control propulsion means of the type shown in FIGURE 13.

FIGURES 13 and 14 are representative of systems in which propulsion, circulation and guidance can be effected simultaneously. For example, fixed foil craft including the propulsion units of the FIGURES 9–12 species, may further mount fluid flap elements in the after section of displacement foil, as in FIGURE 13, or strut, as in FIGURE 14. These FIGURES 13 and 14 guidance systems, being preferably adapted to fixed foils, simply direct the propulsion jets in response to commands. When the respective jets are controllably linked to known fluid flow and pressure responsive means on the forward portions of the foil, the pressure responsive means in turn being relayed to the pumping system, an efficient working of the fluid is obtained. The pressure sensitive means commanding the attitude of the jets and the thrust therefrom, are not shown since the number of such devices is great.

Thus, in FIGURES 13 and 13A, we find foil 7100 having intake port 7110 and fixed exhaust port 7120. At 7130 the exhaust vanes are shown to mount plural jets 7140 rotationally. These jets 7140 define exhaust aperture 7142 by opposed nozzle sections 7144 joined at their sides with suitable spacers 7146, the spacers each mounting integral trunnions 7148, which bear in corresponding journals of the exhaust vanes. The jets are hydraulically connected to a pilot guidance system, each differentially responsive to the pilot command moment.

Varying discharge angles of the jets differentially controls flow over opposite dynamic surfaces, thereby controlling dynamic lift of the foil.

Figures 2, 3, 3A:
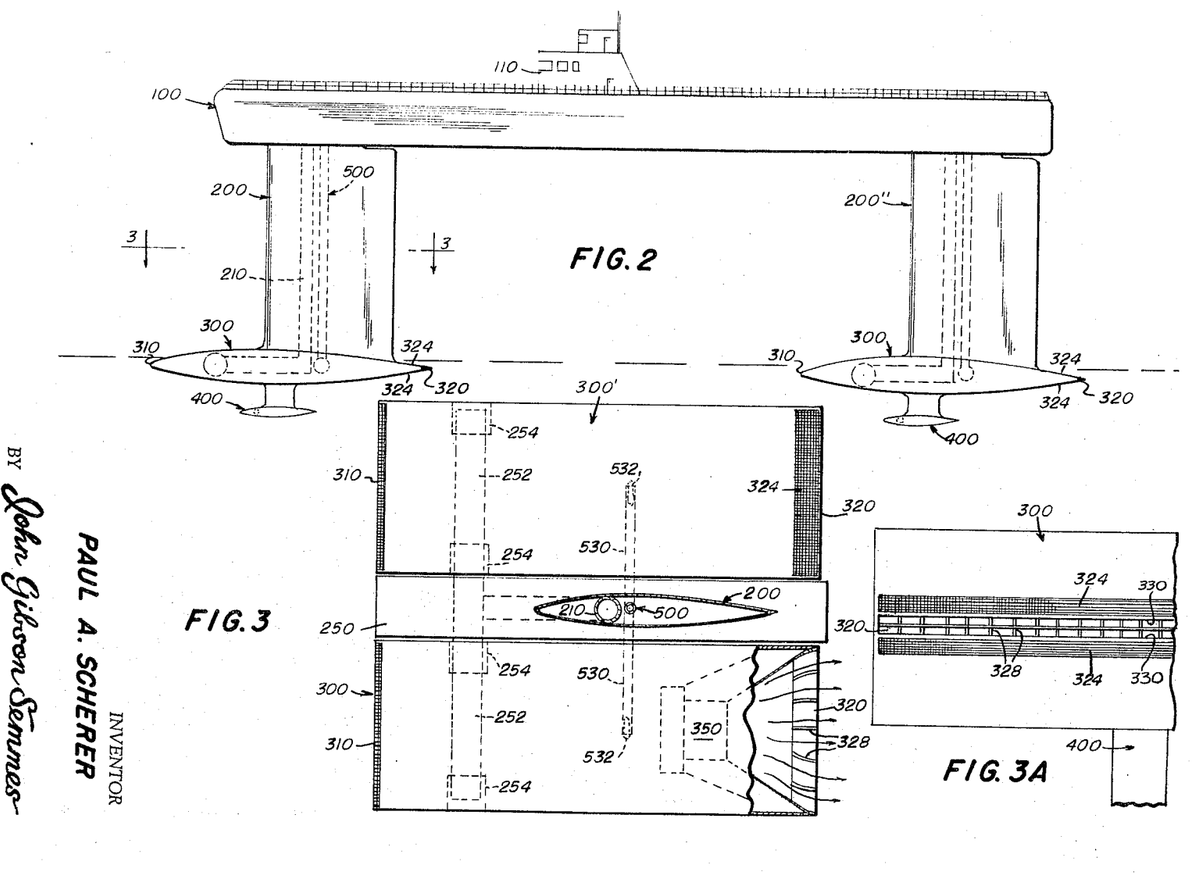
FIGURE 2 is a view in side elevation of the ship of FIGURE 1.
FIGURE 3 is a horizontal sectional view along the lines 3—3 of FIGURE 2 showing foils in plan, part of one being in fragment.
FIGURE 3A is a fragmentary rear view of one foil of FIGURE 2.
Figure 4:
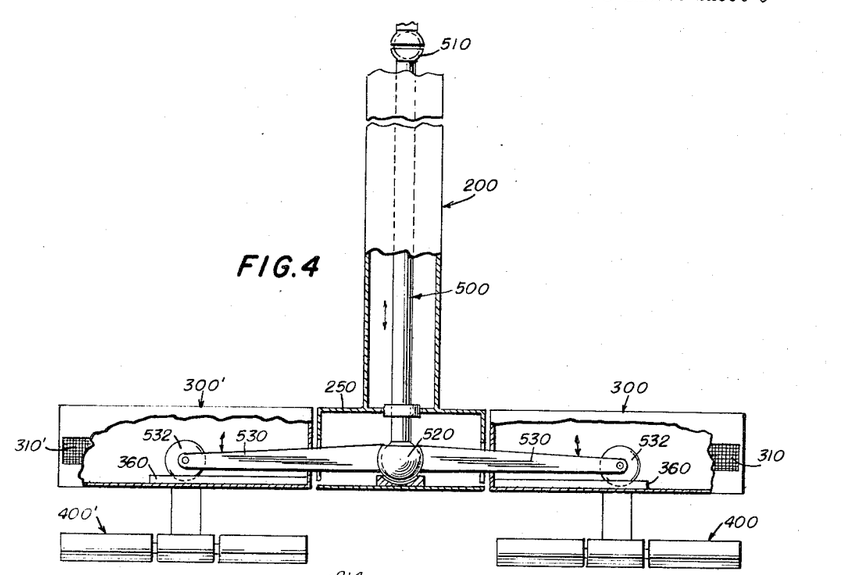
FIGURE 4 is a front elevation of one strut and depending parallel foils, principal and supplemental. In this view, the foil pivot and bearing is removed.

Corresponding numbers in the 800 strut series, FIGURE 14 illustrate components detail for detail similar to those shown in FIGURE 13. Serving these guidance units is a suitable pumping arrangement such as shown in FIGURES 3 and 3A; 9–12 inclusive herein. Again, the jets are differentially operable in response to manual or automatic command.

*External propulsion pumping to gain controlled thrust*

As previously indicated, with reference to FIGURES 9 through 12, inclusive, suitable means for obtaining controlled thrust may be devised by utilizing external propellors with constant torque blades. An efficient means of obtaining controlled thrust in fixed foil has been devised in accordance with FIGURE 15. Here, the respective blades 9150, one of which only is shown, automatically vary their angles of attack with respect to the working fluid by means adapted to maintain the respective torques constant for each half revolution. In the foil 9100, the axle 9200 is adapted for rotation of hub 9110. Within the axle 9200 there are defined plural channels 9218 and 9220, preferably two for each blade. These channels communicate with corresponding distribution grooves 9214 and 9216 for one-half revolution, and the channels communicate with distribution grooves 9214' and 9216' for the other half revolution. The working fluid is introduced through balanced valves and through hydraulic conduits 9260 to the respective distribution grooves. Obviously, there will be required a corresponding set of hydraulic conduits 9260 communicating with distribution grooves 9214' and 9216' in the lower half of the fixed foil, registering a pressure variation suitable for control. The distribution grooves are interrupted at about 180° of their annulus by suitable dams, which momentarily seal off channels 9218 and 9220. The two dams are disposed approximately at 90° and 170° so as to set the blades before they enter into the respective horizontal working areas.

In this system, the propellor blades 9150 are constant lift controlled for at least each one half of a revolution as are the blades of the internal propulsion system of FIGURES 9–12. Thus, it will be seen that if the respective channels 9214–9216 and 9214'–9216' are coupled to opposed pressure responsive media disposed at the forward portions of the foil. As each signal calls for more or less lift on the foil, suitable hydraulic pressures will be generated in conduits 9214–9216 and 9214'–9216', and differential pressures will command the torque applied to the blades.

Figure 15:
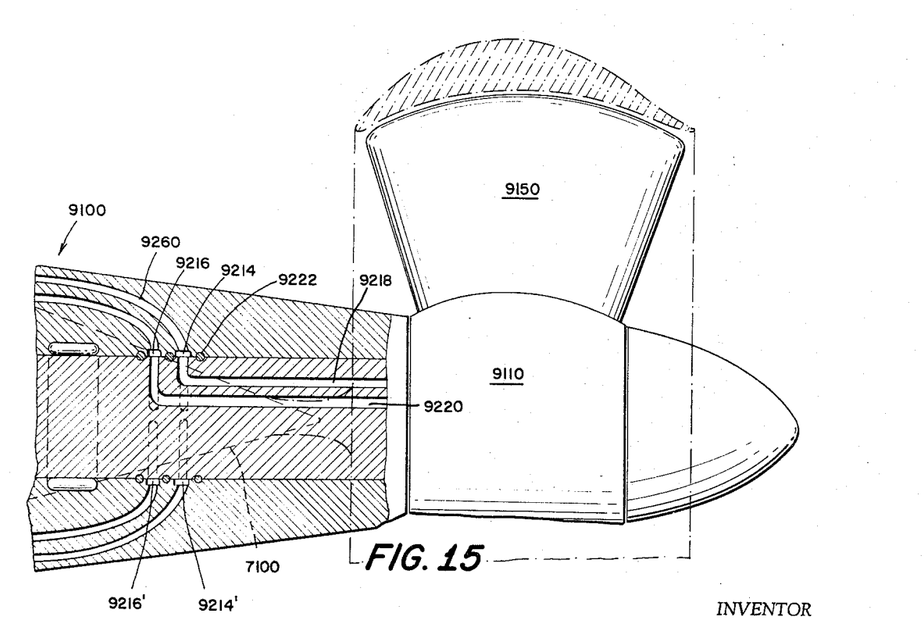
FIGURE 15 illustrates in fragment externally mounted propulsion system, with means for effecting constant lift to the illustrated blade shown.

If the propellors of the external propulsive system are covered by suitable annular foils the effective velocity of approach of fluid to the blade may be reduced, suppressing cavitation. A proposed annular foil is indicated in section in phantom lines, the forward portion of the annular foil is secured to the main foil.

What is claimed:
1. A craft comprising:
 (A) a body;
 (B) body supporting means;
 (C) at least one displacement foil engaging body supporting means;
 (D) craft thrust producing means in operative engagement with craft;
 (E) control means operatively joined to the displacement foil, to control and maintain substantially constant the dynamic lift of the displacement foil relative to the craft, irrespective of variations in the flow of the fluid medium relative to the craft.

2. Craft according to claim 1, in which the displacement foil is rotatable and wherein the control means is also operatively joined to the thrust producing means, whereby the influence of the thrust producing means on the craft maintains constant the lift of the displacement foil relative to the craft, irrespective of variations in the flow of the fluid medium relative to the craft.

3. A craft comprising:
 (A) a body,
 (B) body supporting means mounted on said body,
 (C) at least one displacement foil connected to said body supporting means,
 (D) craft thrust producing means in operative engagement with said foil;
 (E) control means operatively joined to the foil and operatively joined to the thrust producing means, whereby influence of the thrust producing means on the foil maintains constant lift of the foil relative to the craft, irrespective of variation in flow of a fluid medium relative to the craft.

4. Marine craft according to claim 3 in which the body comprises a hull, the supporting means at least one strut.

5. Craft according to claim 4 in which the thrust producing means is disposed within the strut.

6. Craft according to claim 4 in which the thrust producing means is disposed within the foil.

7. Craft according to claim 4 in which the thrust producing means is disposed on the foil, externally thereof.

8. Craft according to claim 4 in which thrust producing means includes means to impart work to propulsive fluid which said means to impart work is contained by the hull, independent of strut and foil.

9. Craft according to claim 4 in which the thrust producing means is disposed exteriorly of the hull.

10. Craft according to claim 4 wherein the displacement foil is fixed and in which control means is likewise operatively joined to the thrust producing means, said thrust producing means being disposed externally of the displacement foil.

11. Craft according to claim 4 wherein the displacement foil is fixed relative to the craft and in which the control means is operatively joined to the thrust producing means, said thrust means being disposed within the foil.

12. Craft according to claim 11 further comprising forward and rearward displacement struts at least one displacement foil being on said forward strut.

13. Craft according to claim 12 in which the rearward strut mounts a foil.

14. Craft according to claim 13 in which the rearward strut mounts a displacement foil.

15. Craft according to claim 14 in which all said foils contain thrust means within.

16. Craft according to claim 10 further comprising forward and rearward displacement struts.

17. Craft according to claim 16 at least one displacement foil being mounted upon said rearward foil, said thrust means being likewise mounted on said rearward foil exteriorly thereof.

18. Craft according to claim 8 in which the craft comprises forward and rearward displacement struts and at least one fixed foil on each, both said foils being operatively connected to each other and to the means imparting work to the propulsive fluid to control and alter circulation of flow over the respective foils.

19. The system according to claim 18 wherein the displacement foil dynamic lift characteristic is augmented by plural exhaust deflection means, independently operable.

20. A hydrofoil ship comprising: a hull, having a longitudinal and a transverse axis; forward and after dependent hull supporting struts; an horizontal axle fixed at the bottom of each of said struts in parallel relation to said transverse axis of said hull; at least one pair of foils comprising first and second displacement foils freely rotated on each of said axles forward of the centers of lift of said foils, and on alternate sides of said strut, the total displacement of all of said foils being greater than the loaded weight of said ship, struts and foils; pivot means mounted on each of said foils equidistant from said axle; a rigid arm interconnecting the pivot means of each foil in each pair of foils; and a force transmitting link interconnecting the center of said arm and a constant force producing source within said ship.

21. The hydrofoil ship of claim 20 further comprising a secondary strut depended from each of said foils and a secondary foil mounted on each of said secondary struts, said secondary foils being aligned at negative angles of attack.

22. A hydrofoil ship comprising: a hull; forward and after dependent hull-supporting struts; at least one displacement foil engaging each strut; ship propulsion pump means having intake and exhaust ends and mounted within at least one of said foils; intake and exhaust channels within said foil, said exhaust channels interconnecting said exhaust end of said pump means and apertures in the trailing edge of said foil and said intake channels within said foil interconnecting the intake end of said pump means with apertures in defined areas of the surface of said foil.

23. The ship construction of claim 22 wherein said channels further interconnect said pump means with boundary layer control apertures in the surface of said foil.

24. A ship having more than one dependent strut; at least one displacement foil mounted on the lower end of each of said struts, the aggregate displacement of all of said displacement foils being greater than the aggregate weight of said ship, struts and displacement foils; a secondary strut dependent from the lower surface of each of said displacement foils; a secondary foil mounted at the lower end of each of said secondary struts, said secondary foil being mounted at a negative angle of attack with respect to the surface of the body of water upon which said ship rests, whereby the secondary foils submerge the displacement foils when the ship is underway.

25. The ship according to claim 22 comprising two struts forward and one aft, said forward foils each containing ship propulsion pump means within said foils.

26. The ship according to claim 25 in which all foils contain ship propulsion pump means accordingly.

27. The ship according to claim 25 in which the channels of the forward foils further interconnect said pump means with boundary layer control apertures in the surface of each said foil.

28. The ship according to claim 26 wherein the channels of all the foils further interconnect said pump means with boundary layer control apertures in the surface of each of said foil.

29. The ship according to claim 22 in which the ship propulsion pump means is mounted in each foil and in which the respective pump means are connected in series foil to foil whereby the foil intake and exhaust of one pump may be controllably connected to the intake and exhaust of the other.

30. In pumping means adapted to generate thrust upon a moving fluid, a hub, at least one radial blade mounted thereon, controllable balancing means operatively associated with said blade for applying a generated torque to the blade in opposition to the torque dynamically generated on the blade by the fluid, to maintain the thrust of the blade on the fluid substantially constant in the presence of variations in the flow fluid relative to the pump.

31. The movable structure of claim 30 comprising plural radial blades complemental to each other, each of said blades being independently operatively associated wtih means for applying a generated moment in opposition to the thrust moment thereof.

32. Pumping system of claim 30, comprising in combination stationary fluid conduit means of varying cross-sectional dimension to entrain fluid upon which the pumping means exerts a force to conduct fluid to pumping means and return to surrounding fluid whereby the variation in dimension of conduit means preserves a controlled approach velocity of fluid to the pumping means blades such that the cavitation number of blades shall not be exceeded at design operating speeds.

33. The movable structure of claim 30 in combination with marine craft, adapted to propel same irrespective of variations in the flow of environmental fluid.

34. The movable structure according to claim 30 in combination with aircraft adapted to propel same irrespective of variations in the flow of environmental fluid.

35. The movable structure according to claim 30 in which said balancing means comprises a cylinder-piston system mounted in connection with same, one end of which is open to the atmospheric pressure, and the other end of which communicates with a source of reduced pressure.

36. The movable structure according to claim 35 in which the connection between balancing means and said blade includes a variable moment arm, the length of which varies with location of said blade.

37. A rotary fluid pump having at least one blade, said blade being mounted for variable pitch control, balancing means connected to the blade in opposition to the thrust moment of the blade whereby upon operation, the thrust moment will be substantially constant irrespective of variation in either the flow or viscosity of the fluid being pumped.

38. A propulsion system comprising:
(A) a generally cylindrical conduit;
(B) a shaft rotating centrally within said conduit;
(C) a plurality of radially oriented elements projecting from said shaft;
(D) a plurality of blades, each of said blades defining a leading edge and a trailing edge and an opening spaced from said leading edge and thereto oriented parallel, the opening adapted to receive one of said elements, thereby rotating said blades with said shaft; and
(E) means associated with said elements to apply a torque to each of said blades, tending to axially align said blades with respect to said shaft.

39. A pump comprising:
(A) a hollow, generally spherical casing;
(B) intake and exhaust pipes communicating with said casing;
(C) a driving shaft rotating within said casing and said pipes;
(D) a spherical hub fixed on said shaft and positioned centrally in said casing;
(E) more than one rod projection through said hub, aligned on a radius thereof and therein freely rotating;
(F) a blade fixed on each of said rods, said blade extending from said hub to said casing and describing a foil cross section; and
(G) means turning said rods thereby controlling angles of attack of said blades.

40. The apparatus of claim 39 wherein said means turning said rod applies a constant torque on said rod.

41. The apparatus of claim 39, wherein said blade is twisted thereby describing a uniformly varying angle of attack.

42. The apparatus of claim 39, wherein each of said blades comprises upper and lower portions having corresponding slidable engaging elements and an intermediate compression member surrounding said elements and separating said portions.

43. The apparatus of claim 39, further comprising a journal bearing supporting said shaft in said exhaust pipe, a shaft stator holding said bearing, and more than one strut extending between the exhaust pipe and sleeve, said struts describing foil cross sections inclined at a positive angle of attack to fluid flow through said pump.

44. The pump apparatus of claim 39 wherein said driving shaft is hollow and wherein said means turning said rods comprises at least one fluid actuator comprising a cylinder mounted within said shaft at least one pressure line communicating said cylinder with a source of constant pressure, a piston movable in said cylinder, torque applying means fixed on said rod and connection means interconnecting said piston and said rod.

45. In foil supported craft having at least one submerged displacement foil defining first and second opposite complementary surfaces, a method of controlling the lift imparted to said foil by fluid respectively flowing about said foil, comprising respectively varying circulation across said complementary surfaces of said foil.

46. The method of claim 45 comprising increasing circulation across said first surface of the foil by withdrawing a portion of fluid into said foil through an elongated intake port in said first surface, said port being oriented perpendicular to circulation.

47. In fluid supported foil craft, the improvement in foil supporting systems of at least one fixed displacement foil in which plural and opposed fluid intakes are disposed in independent boundary layer operative relation to each other to control laminar flow of the fluid supporting medium over the respective surfaces of the foil, means connected with said intakes for entraining the fluid, and propulsion exhaust means connected with said entraining and intake means, and lift control operatively associated with said intakes.

48. In fluid supported craft, the improvement in foil supporting systems of at least one fixed displacement foil in which the propulsion system is mounted in the after portion thereof, the propulsion system comprising plural blades independently rotatable in response to demand lift moment, said blades being mounted for independent boundary layer operative relation to each other, controlling laminar flow of the fluid supporting medium over the respective displacement foil surfaces, control means operatively joined to the blades of the propulsion system to control and maintain constant the demand lift thereof sufficient to insure maximum boundary layer control.

49. The system according to claim 47 in which lift characteristics of the foil are augmented by exhaust deflection means.

50. The system according to claim 41 in which the deflection means is fluid flow.

51. In hydrofoil craft having at least one submerged hydrofoil, leading and trailing edges defining first and second opposite complementary surfaces longitudinally terminated by leading and trailing edges, the improvement of apparatus to control the lift imparted to said foil by fluid flowing across said surfaces comprising:
 (A) at least one fluid entraining conduit positioned within said foil, said conduit having first and second open ends, said first end of said conduit defining a port in said first surface parallel to the trailing edge;
 (B) a pump mounted within said foil, said pump drawing fluid from said second end of said conduit;
 (C) means operatively associated with said conduit to control fluid flowing therethrough; and
 (D) jet entraining means connecting said pump with an opening in said trailing edge.

52. The apparatus of claim 51 wherein said jet entraining means comprises a rotatable nozzle.

53. Craft according to claim 3 in which the thrust producing means is contained within the foil to alter the circulation over the foil.

54. Craft according to claim 3 in which the thrust producing means is disposed on the foil externally thereof, to alter the circulation over the foil.

55. Aircraft according to claim 3 in which the thrust producing means is disposed within the strut to alter circulation over the foil.

56. A craft comprising:
 (A) a body,
 (B) body supporting means mounted on said body,
 (C) at least one displacement foil connected to said body supporting means.

57. The craft of claim 56 wherein said displacement foil defines a span and a chord, and wherein said span is greater than one half times the chord.

58. The craft of claim 57 wherein said body supporting means defines a transverse thickness perpendicular to a direction of travel of said craft, and wherein said span is at least ten times as great as said thickness.

References Cited

UNITED STATES PATENTS

| | | | |
|---|---|---|---|
| 1,768,130 | 6/1930 | Meaux | 103—89 |
| 1,846,602 | 2/1932 | Lake | 114—66.5 |
| 1,887,417 | 11/1932 | Mawson | 103—89 |
| 2,773,467 | 12/1956 | Bailey | 114—66.5 |
| 2,749,870 | 6/1956 | Vavra | 114—66.5 |
| 2,749,871 | 6/1956 | Scherer et al. | 114—66.5 |
| 2,773,467 | 12/1956 | Bailey | 114—66.5 |
| 2,804,038 | 8/1957 | Barkla | 114—66.5 |
| 2,906,228 | 9/1959 | Wendel | 114—66.5 |
| 3,141,437 | 7/1964 | Bush et al. | 114—66.5 |

FOREIGN PATENTS

| | | |
|---|---|---|
| 717,416 | 10/1954 | Great Britain. |
| 829,174 | 3/1938 | France. |

MILTON BUCHLER, *Primary Examiner.*

ANDREW H. FARRELL, *Examiner.*

D. P. NOON, *Assistant Examiner.*